> United States Patent Office 3,546,789
Patented Dec. 15, 1970

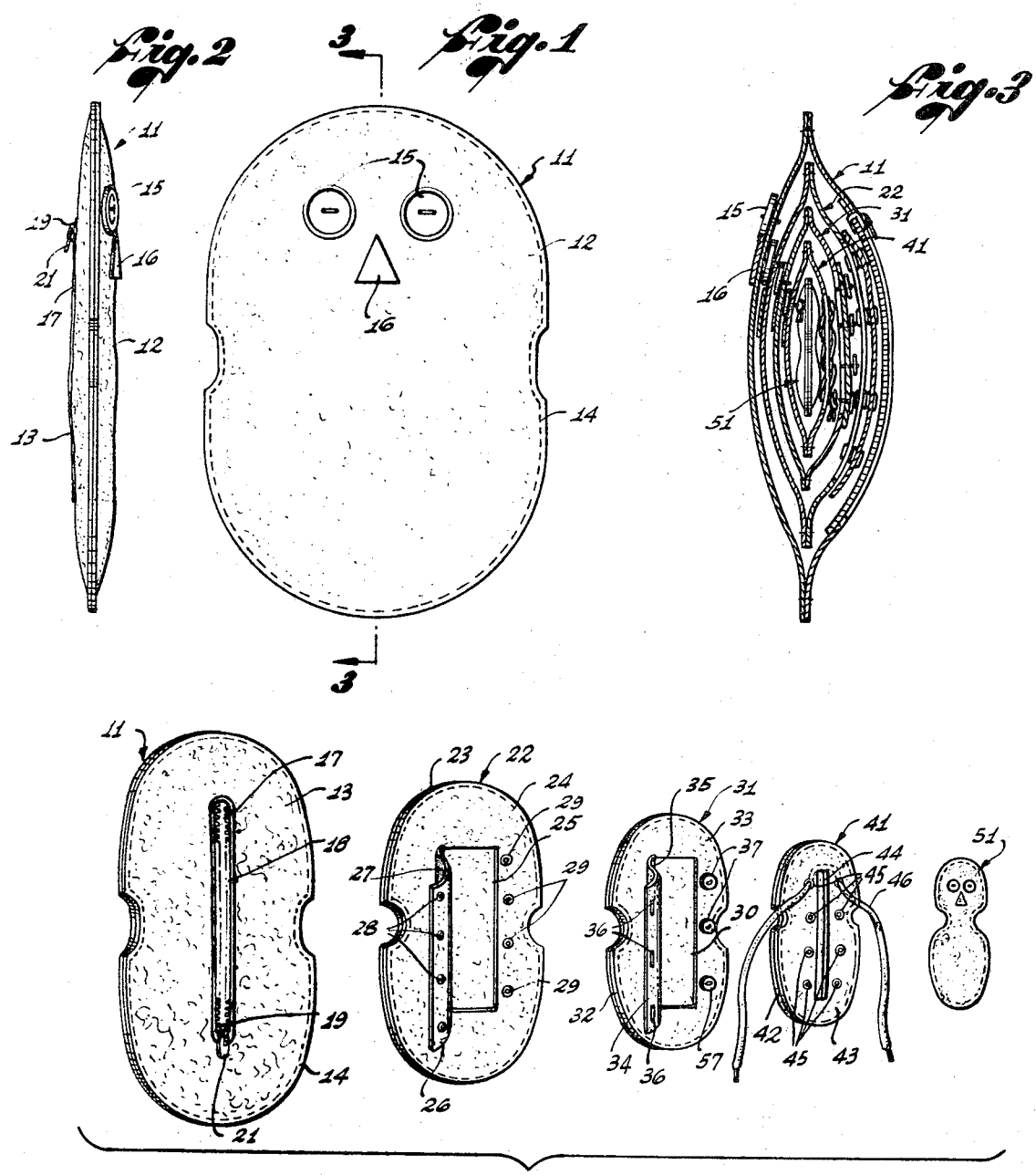

3,546,789
EDUCATIONAL MULTIPLE DOLL SET
Joel R. Kushell and Sheila M. Kushell, La Mirada, Calif., assignors, by mesne assignments, to Fisher-Price Toys, Inc., East Aurora, N.Y.
Filed Nov. 20, 1968, Ser. No. 777,273
Int. Cl. G09b 19/00
U.S. Cl. 35—8                               7 Claims

ABSTRACT OF THE DISCLOSURE

A teaching top composed of a plurality of different size doll-like elements in the form of envelopes of progressively decreasing size having openings thereinto for the reception of smaller elements which are thereby nested according to their size within the next larger envelope. The openings into the elements, except for a smallest, permanently closed one, are provided with different closure elements, preferably successively more difficult as the elements decrease in size so that the largest, exterior element has the simplest form of closure, with the closures requiring greater degrees of skill to manipulate as the elements diminish in size down to the last envelope-type element. Specifically, the outermost element may have a zipper closure, the next smaller, snaps, the next, buttons, and the smallest envelope, eyelets and laces, with, if desired, an imperforate element within the last.

BACKGROUND OF THE INVENTION

This invention relates to the field of teaching or educational toys where a child learns a useful accomplishment as an incident to his play.

Educational toys and nested educational toys are known in the art, and these perform desirable teaching functions, but with the degree of complexity of manipulation comparable within the set, and not of a progressively more difficult and challenging nature, as in the multiple doll-like set of the present invention, where access to interior dolls and the recovering of interior dolls is progressively more difficult toward dolls of diminishing size.

SUMMARY OF THE INVENTION

In the educational multiple doll-like set of the present invention, access to successive dolls within the set preferably becomes increasingly difficult as the size of the doll-like elements decrease, so that the use of the toy increases the knowledge and dexterity of the child, and the child is given an incentive to master the more intricate fastenings so as to secure access to and re-close the interior elements in the set. Thus, the readily accessible outer element has a simple zipper closure which the child manipulates simply by engaging the zipper tag and moving it along the zipper parts. The next interior element has a panel, flap or like closure which may be secured by means of simple snaps which are easily disengaged by the child. A third and next interior element has a more difficult button and button-hole attachment for its flap closure which requires greater dexterity in the child and teaches him the use of the more difficult button attachment. A fourth and next interior element has the much more difficult laced closure therefor which a child has the incentive to master to secure access to the smallest element at the center of the set. Thus, each succeeding doll-like element in the nested set has a closure which requires greater knowledge and dexterity on the part of the child, and all of which give an incentive to the child to master the type of closure used to secure access to interior dolls in the set. The teaching toy will thus span a considerable period in the child's development, giving him access to interiors in accordance with his knowledge and dexterity of the type of fastening involved and serving to inspire and teach mastery of the different types of fastenings. Teaching will therefore be commensurate with the child's development, and cover a considerable time period therein without losing the child's interest.

BRIEF DESCRIPTION OF THE DRAWING

FIG. 1 is a front elevational view of a multiple doll set according to the present invention;

FIG. 2 is a side elevational view;

FIG. 3 is a vertical sectional view on the line 3—3 of FIG. 1 with the individual dolls artificially expanded to show their relationship in the nested set; and FIG. 4 is an expanded perspective view showing the individual dolls of the set and the different closure means therefor.

DESCRIPTION OF THE PREFERRED EMBODIMENT

An educational multiple doll set according to the present invention may take any configuration as long as they are of an envelope form having closures, with the dolls of the set of different size so as to nest one within another. Only the outer doll may be seen in FIGS. 1 and 2, at 11, made up of a front panel 12 and a rear panel 13 stitched together at 14 around their edges. The front panel 12 may be given any desired facial or body configuration by drawing, painting, attached parts or the like, here shown with button eyes at 15 and a triangular nose 16 sewed or cemented to the panel. Additional facial and body configurations can be added to any front panel as desired.

FIG. 3 is a vertical section through the multiple doll set showing them nested together and with the individual dolls artificially expanded from their normal flat condition to produce an effective separation in the figure by which the individual dolls in the multiple set may be distinguished from each other. It will be understood that in normal use the set is flat, as shown in FIG. 2.

The panels 12 and 13 form an envelope with the space therebetween a chamber for the reception of the next smaller doll in the set. The panels 11 and 12 are preferably of a pleasing flexible material, although rigidity is not precluded, and any cloth, plastic, leather or composition material may be used. Access to the interior of the envelope formed between the panels is through an opening, here shown in the back panel 13 adjacent the center thereof at 17, the opening 17 being in the form of an elongated slit within which are sewed the parts of a conventional zipper 18 having a slider 19 and a tag 21 for moving the slider to open and close the zipper.

The next smaller doll in the set is indicated at 22 in FIG. 4 as having substantially the same exterior configuration as the doll 11, and it may have a like or dissimilar face and body configuration. The doll 22 is likewise formed of front and back panels 23 and 24, respectively, stitched together about their edges to form an envelope and, in the embodiment shown in FIG. 4, with the back panel 24 provided with a large opening 25 closed by a flap 26 joined to one edge of the opening at 27 and with the opposite edge of the flap 26 provided with male snap elements 28 adapted to engage the female snap elements 29 along the cooperating edge of the opening 25 whereby the flap 26 closes off the opening.

The next smaller doll in the set is shown at 31 in FIG. 4 with a front panel 32 and a rear panel 33 sewed at their edges to form an envelope closure as in the dolls 11 and 22. The doll 31 has a large opening 30 in its back panel, adapted to be closed by a flap 34 joined to one edge of the opening 30 at 35. The free edge of the flap 34 is provided with button holes 36 adapted to receive buttons 37 adjacent the cooperating edge of the opening 30, whereby the opening is closed by the flap 34 when the buttons and button-holes are engaged. The doll 31 may have the same face, body and over-all configuration and design as the dolls 11 and 22 previously described.

The next smaller doll is shown at 41 in FIG. 4 and has a front panel 42 and a rear panel 43 stitched at their outer edges as before to form an envelope, and with the back panel 43 provided with an elongated slot or opening 44, adjacent the opposite edges of which are eyelets 45 for the reception of a shoelace 46 by which the slot 44 is to be laced shut, similarly to a shoe.

Within the smallest envelope doll 41 may be disposed an imperforate doll 51, similar in face and body design to the previous dolls, and formed similarly but without an opening therein.

There are thus provided in the preferred embodiment four successively smaller dolls of envelope form with openings therein and a fifth imperforate doll to be received in the smallest envelope doll. Each envelope doll is then nested within the next larger doll, the openings being successively closed by the attachments therein provided from a zipper 18 in the largest, through the snaps 28, 29 in the next smaller, the buttons and holes 37, 36 in the third smaller, and the lacing and eyelets 46, 45 in the smallest envelope doll. Each doll in the set provides an incentive for opening its closure to secure access to the next smaller doll thereinside. The child is thus motivated to operate the closure of each doll in succession, so that he can secure access to the interior ones, and he thus becomes skilled in the use of the various types of fastening means.

With the fastening means of increasing complexity as the dolls become smaller, the child works his way as his knowledge and skill increase to secure access to smaller and smaller dolls, and finally to the imperforate doll 51. In this way, with the increasing complexity of the fastenings, the toy not only instructs the child by degrees to increase his skill and dexterity, but also enables the toy to be effective in a teaching sense over the relatively long span of time required by the child to progress in his knowledge and skill from a simple zipper slider to the lacing type of fastening.

While four different types of closures or fasteners have been disclosed for the preferred embodiment, it is understood that mor or less may be incorporated in the dolls which may be of any number in the set, as desired, the four envelope-type dolls shown are to be considered merely exemplary and not limiting the scope of the toy nor of the invention which is to be given its broadest interpretation within the terms of the following claims.

We claim:
1. An educational multiple element set comprising:
a plurality of elements of similar configuration and of progressively smaller size to nest one within the other, said elements having cavities therein in which said nesting is effected;
openings accessible from the exterior of said elements leading into said interior cavities through which the interior nesting element may be inserted; and
closures for said openings of different style and configuration for the different elements to teach a child the operation of the different closures, said closures including at least a zipper and a lacing for the openings into separate elements.

2. An educational multiple element set comprising:
a plurality of elements of similar configuration and of progressively smaller size to nest one within the other, said elements having cavities therein in which said nesting is effected;
openings accessible from the exterior of said elements leading into said interior cavities through which the interior nesting element may be inserted; and
closures for said openings of different style and configuration for the different elements to teach a child the operation of the different closures, said elements being of doll-like form and child attractiveness, each element in said set comprising a front and back panel having a doll-like configuration on at least the front panel and with said opening generally centrally disposed in the back panel and extending longitudinally of the element.

3. The educational set defined in claim 2 in which said front and back panels are joined together adjacent their outer edges to form a cavity therebetween extending throughout substantially the entire dimensions of the panels.

4. The educational set defined in claim 1 in which said zipper is on the opening into the largest outer element of the set and said lacing is on the opening into the smallest element in the set which has a cavity and opening leading thereinto.

5. The educational set defined in claim 4 including a closure of buttons and holes therefor and opening into a third element of the set.

6. The educational set defined in claim 5 including:
a closure of snaps for the opening into a fourth element of the set.

7. The educational set defined in claim 6 in which said closures are located in the following order as the elements progressively decrease in size:
a zipper, snaps, buttons and holes, and lacing.

References Cited
UNITED STATES PATENTS

| | | | |
|---|---|---|---|
| 784,888 | 3/1905 | Reisner | 46—153 |
| 2,424,538 | 7/1947 | Beder | 35—73X |
| 2,501,902 | 3/1950 | Howell | 35—56 |

FOREIGN PATENTS

| | | | |
|---|---|---|---|
| 909,152 | 10/1962 | Great Britain | 35—8 |

WILLIAM H. GRIEB, Primary Examiner

U.S. Cl. X.R.

46—153